(12) United States Patent
Moser et al.

(10) Patent No.: US 10,365,992 B2
(45) Date of Patent: Jul. 30, 2019

(54) PROTECTING AGAINST AN UNINTENTIONAL RE-EXECUTION OF COMMANDS IN A SHELL HISTORY

(71) Applicant: International Business Machines Corporation, Armonk, NY (US)

(72) Inventors: Kyle R. Moser, Stone Ridge, NY (US); Andrew P. Wack, Millbrook, NY (US); Maria R. Ward, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 15/493,225

(22) Filed: Apr. 21, 2017

(65) Prior Publication Data
US 2018/0307588 A1 Oct. 25, 2018

(51) Int. Cl.
*G06F 8/30* (2018.01)
*G06F 8/70* (2018.01)
*G06F 11/36* (2006.01)
*G06F 21/50* (2013.01)

(52) U.S. Cl.
CPC ........... *G06F 11/3668* (2013.01); *G06F 8/30* (2013.01); *G06F 8/70* (2013.01); *G06F 21/50* (2013.01)

(58) Field of Classification Search
CPC ........... H04L 63/1416; H04L 63/1425; G06Q 10/0635; G06F 8/31
USPC .................................... 717/101, 114; 726/23
See application file for complete search history.

(56) References Cited

U.S. PATENT DOCUMENTS

| | | | |
|---|---|---|---|
| 5,032,979 A | 7/1991 | Hecht et al. | |
| 5,440,739 A * | 8/1995 | Beck | H04L 41/0893 709/221 |
| 6,405,318 B1 * | 6/2002 | Rowland | G06F 21/552 726/22 |
| 9,323,927 B2 | 4/2016 | Lee et al. | |
| 2002/0144135 A1 * | 10/2002 | Langford | G06F 21/554 726/2 |
| 2006/0265629 A1 * | 11/2006 | Kwong | G06F 11/3688 714/38.1 |

(Continued)

FOREIGN PATENT DOCUMENTS

CN 102571476 A 7/2012

OTHER PUBLICATIONS

Silverman, "CERN UNIX User Guide" (Year: 2002).*

(Continued)

*Primary Examiner* — Phillip H Nguyen
(74) *Attorney, Agent, or Firm* — Cantor Colburn LLP; Steven Chiu

(57) ABSTRACT

Embodiments include method, systems and computer program products for protecting against unintentional command re-execution. The method includes applying a shell wrapper to a shell history in which the shell history includes one or more commands. The method further includes analyzing each of the one or more commands in the shell history using the shell wrapper. The method further includes disabling an ability to re-execute one or more commands in the shell history based on a determination that the one or more commands in the shell history are determined to be potentially dangerous.

20 Claims, 4 Drawing Sheets

(56) References Cited

U.S. PATENT DOCUMENTS

2008/0010553 A1* 1/2008 Betawar ............... G06F 11/263
714/46
2013/0097250 A1* 4/2013 Zion ................. H04L 12/6418
709/206
2013/0297566 A1* 11/2013 Colrain ............ G06F 17/30371
707/674

OTHER PUBLICATIONS

Appleby et al., "CERN UNIX User Guide Version 1.02" (Year: 1994).*
Davison et al., "Toward an Adaptive Command Line Interface" (Year: 1997).*
P Wainwright, "Command Line and Shell Interaction" (Year: 2005).*

* cited by examiner 165 df -k
166 lsvg
167 lspv
168 #ifconfig en0 down
169 cd /tmp
170 rm -rf /tmp/junk.data
171 cd /datadir
172 #rm -rf *
173 uptime
174 #shutdown -Fr
175 uptime
176 #shutdown -Fh
177 cd /tmp/olddata
178 #rm *
179 lsps -s
180 history -15

FIG. 4

PROTECTING AGAINST AN UNINTENTIONAL RE-EXECUTION OF COMMANDS IN A SHELL HISTORY

BACKGROUND

The present invention relates to user interaction within a programming environment for a computing device, and more specifically, to the prevention of re-executing dangerous commands unintentionally when using a shell history.

Operating system (OS) command line interfaces are usually programs supplied in conjunction with an operating system, for example, UNIX, Linux, or Windows, in which a programmer issues commands to a program in the form of successive lines of text (command lines). The program that implements this text-based interaction is often called a command-line interpreter, command processor, or shell. The shell often includes a history command that allows the programmers to view previous commands entered by the programmer. The programmer has the option to re-execute commands listed in the shell history.

SUMMARY

One or more embodiments of the present invention provide a method for protecting against unintentional command re-execution. The method includes applying a shell wrapper to a shell history in which the shell history includes one or more commands. The method further includes analyzing each of the one or more commands in the shell history using the shell wrapper. The method further includes disabling an ability to re-execute one or more commands in the shell history based on a determination that the one or more commands in the shell history are determined to be potentially dangerous.

One or more embodiments of the present invention provide a computer program product can comprise a non-transitory storage medium readable by a processing circuit that can store instructions for execution by the processing circuit for performing a method for protecting against unintentional command re-execution. The method includes applying a shell wrapper to a shell history in which the shell history includes one or more commands. The method further includes analyzing each of the one or more commands in the shell history using the shell wrapper. The method further includes disabling an ability to re-execute one or more commands in the shell history based on a determination that the one or more commands in the shell history are determined to be potentially dangerous.

One or more embodiments of the invention provide a system for protecting against unintentional command re-execution. The system can include one or more processors in communication with at one memory. The processor can be configured to perform a method for protecting against unintentional command re-execution. The method includes applying a shell wrapper to a shell history in which the shell history includes one or more commands. The method further includes analyzing each of the one or more commands in the shell history using the shell wrapper. The method further includes disabling an ability to re-execute one or more commands in the shell history based on a determination that the one or more commands in the shell history are determined to be potentially dangerous.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a depiction of a shell history that has implemented a method for protecting against unintentional command re-execution according to one or more embodiments of the present invention.

Figure 1:
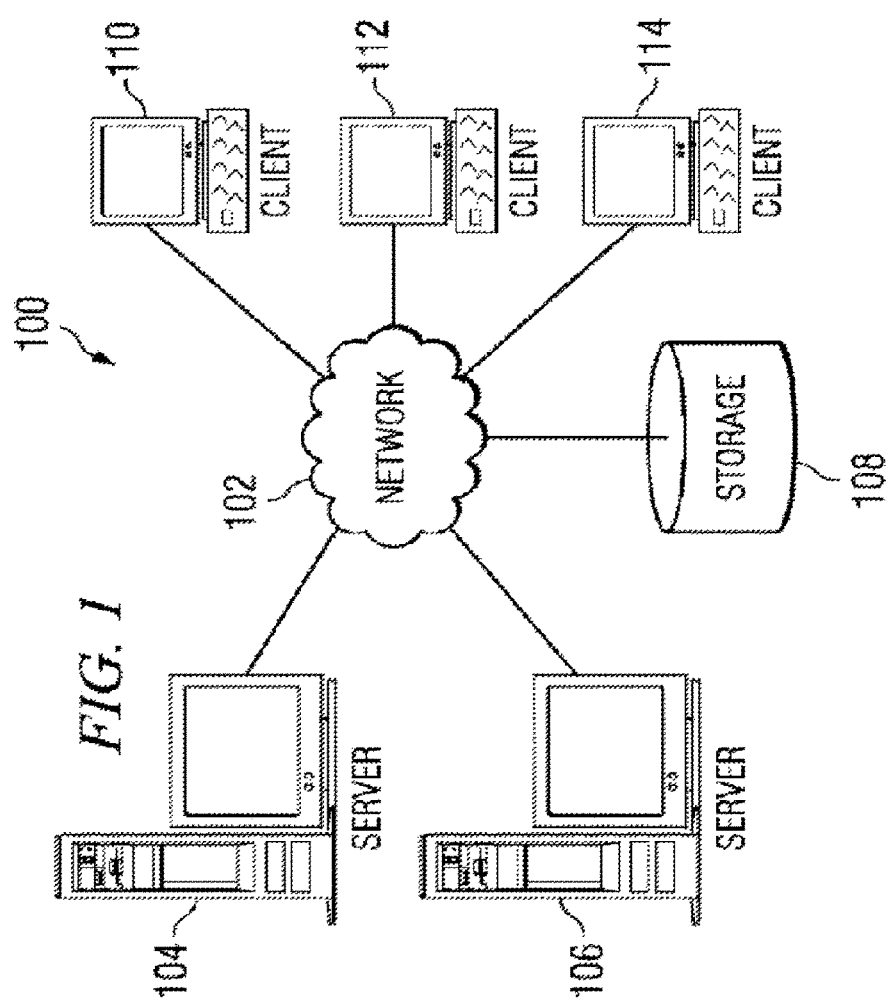
FIG. 1 is an exemplary diagram of a distributed data processing system in which exemplary aspects of the present invention may be implemented.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems, and computer program products for protecting against unintentional command re-execution when interacting with a shell history is described herewith.

When programming using an operating system that employs a shell environment, programmers often use a history command to display a list of commands previously executed. The use of the history command is beneficial since the programmer can re-execute commands from the history without having to re-enter the command manually. However, when in the midst of programming, the programmer is usually hurriedly coding or editing coding using the shell history to re-execute commands in order to speed up the programming process. While such use is normally benign, programmers can occasionally re-execute unintended commands accidentally.

Unintentional shell history command retrieval and re-execution for non-privileged and especially for privileged user IDs at the application, database, and system levels, can potentially result in a wide range of moderate to significant to severe negative impacts at various levels of the system and business, which may require weeks, months, and/or years to be discovered. These negative impacts (moderate/significant/severe) to the system and business can include any of the following: data loss; data corruption; application; database and/or system corruption; interruption of systems operations/availability; suspension of systems operations/availability; loss of network connectivity; backup data loss; unplanned high availability failover; unplanned disaster recovery failover; denial of system access; security exposures, including data breach; unplanned human resources/skills/costs needed for problem discovery, determination, and resolution; slow down/halt of other projects when their human resources/skills/costs needed for this problem discovery, determination, and resolution; loss of Customers or Customer satisfaction; loss of business, current and future; loss of revenue, current and future; loss of business and corporate reputation; civil penalties; criminal penalties; etc.

Accordingly, protecting against unintentional command re-execution when a programmer interacts with a shell history would be beneficial. This can be especially applicable when programmers are in a rush to complete an assignment or there are multiple programmers simultaneously using a shared user ID.

In order to address unintended command re-executions, the embodiments of the present invention can employ a shell wrapper to analyze a shell history and disable an ability to re-execute designated commands or command types. Accordingly, the shell wrapper can prevent the programmer from re-executing potentially damaging/dangerous commands without an active removal of the disabling feature, thereby reducing human error.

With reference now to the figures, FIG. 1 depicts a pictorial representation of an exemplary distributed data processing system in which aspects of the illustrative embodiments of the present invention may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the exemplary embodiments of the present invention may be implemented.

Figure 2:
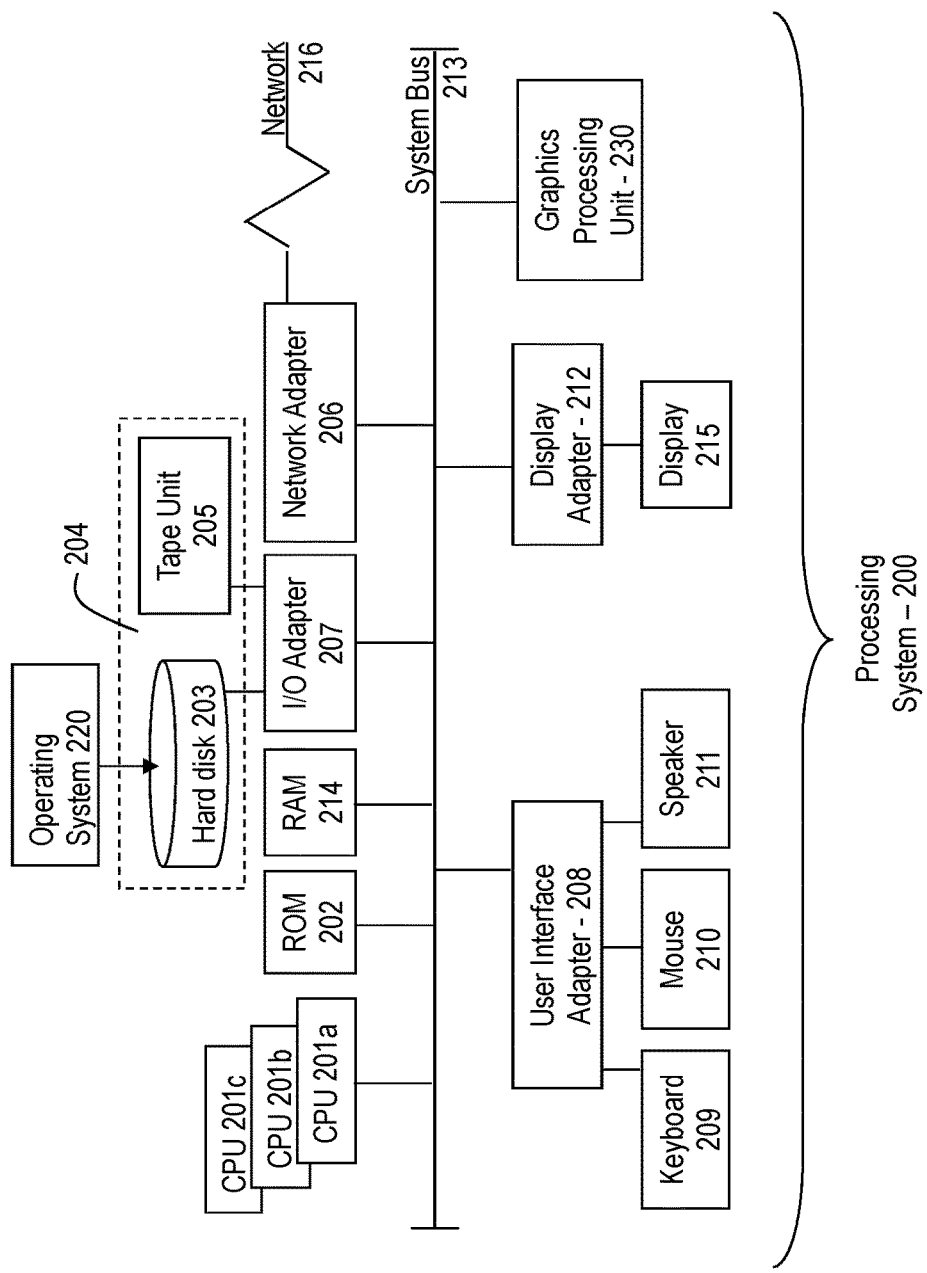
FIG. 2 is a block diagram illustrating one example of a processing system for practice of the teachings herein.

With reference now to FIG. 2, a block diagram of an exemplary data processing system is shown in which aspects of the exemplary embodiments of the present invention may be implemented. Data processing system 200 is an example of a computer, such as server 104 or client 110 in FIG. 1, in which computer usable code or instructions implementing the processes for exemplary embodiments of the present invention may be located. In this embodiment, the processing system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. A network adapter 206 interconnects bus 213 with an outside network 216 enabling data processing system 200 to communicate with other such systems. A screen (e.g., a display monitor) 215 is connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A keyboard 209, mouse 210, and speaker 211 are all interconnected to system bus 213 via user interface adapter 208, which may include, for example, a Super I/O chip integrating multiple device adapters into a single integrated circuit.

In exemplary embodiments, the processing system 200 includes a graphics processing unit 230. Graphics processing unit 230 is a specialized electronic circuit designed to manipulate and alter memory to accelerate the creation of images in a frame buffer intended for output to a display. In general, the graphics processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as keyboard 209 and mouse 210, and output capability including speaker 211 and display 215. In one embodiment, a portion of system memory 214 and mass storage 204 collectively store an operating system 220.

The operating system 220 essentially controls the execution of other computer programs by the processor 201 and provides scheduling, input-output control, file and data management, memory management, and communication control and related services. The operating system 220 also coordinates and provides control of various components within the processing system 200. As used by a client, for example, client 110, the operating system 220 may be a commercially available operating system, for example, UNIX, Linux, Windows, or the like. A user interacting with the processing system 200 through operating system 220 can use a command-line interface/interpreter, i.e., a shell. The user can control the operation of the processing system 200 by entering commands as text for the command line interpreter to execute, or by creating text (shell scripts) of one or more such commands.

Turning now to an overview of aspects of the present invention, one or more embodiments of the invention provide methods, systems, structures and computer program products configured to use a shell wrapper to analyze a shell history and disable an ability to re-execute designated commands or command types using a character prefix (#) or statement (rem) depending on the operating system in use by the programmer. The disabled commands could not be re-executed until the programmer actively removes the character prefix or statement. Accordingly, the shell wrapper can prevent the programmer from re-executing potentially damaging/dangerous commands without an active removal of the disabling feature thereby reducing human error.

Figure 3:
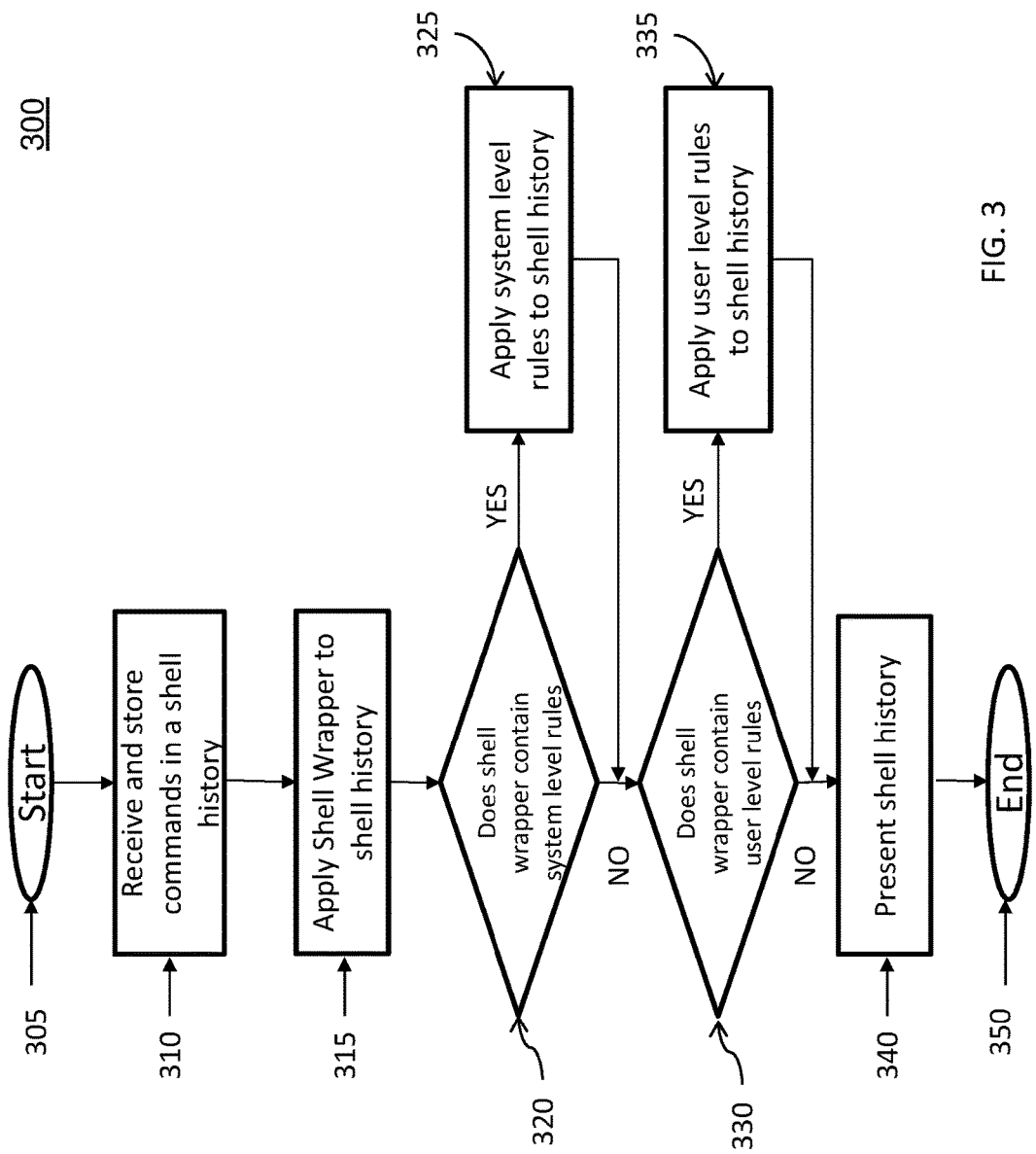
FIG. 3 is a flow diagram illustrating a method for protecting against unintentional command re-execution according to one or more embodiments of the present invention.

FIG. 3 is a flow diagram 300 illustrating a computer-implemented method of protecting against unintentional command re-execution according to one or more embodiments of the present invention. After starting at block 305, the computer-implemented method proceeds to block 310 where a shell history receives one or more commands from a user of an operating system, for example, operating system 220. The user can by identified by, for example, a user ID, which associates one or more privileges that govern how the user can interact with a processing system, for example, processing system 200, and which commands the user can perform. In Linux, for example, the user may be privileged and can access and interact with a Linux kernel. If the user is non-privileged, the user may only run applications on a client, for example, client 110.

At block 315, the computer-implemented method applies a shell wrapper to the commands stored in the shell history. The shell wrapper can be a shell script that can be applied to the shell history that can modify or update the shell history before shell history is used.

At block 320, the computer-implemented method determines whether the shell wrapper contains any system level rules. System level rules can be instituted using a rules-type configuration file created by a system administrator to specify rules for any manually executable based command line interface (CLI) command, for example, Linux/Unix/Windows commands, including non-privileged and/or privileged commands. The system level rules can be associated with one or more user or groups. For example, the system level rules can be associated with individual users, user groups defined at the system level, user groups defined within applications and databases, user groups defined within the command protection configuration file, all users, or the like. The system level rules can also be associated with shells. For example, the system level rules can be associated with individual shells, shell groups, all shells, or the like. The system level rules can also be associated with commands. For example, the system level rules can be associated with individual commands, command groups, all commands, or the like. Further, the system level rules can be associated with any combination of users, groups, applications, databases, shells, or commands. If system level rules do not exist, the computer-implemented method proceeds to block 330.

If system level rules exist, the computer-implemented method proceeds to block 325, where the system level rules are applied to the shell history. The shell wrapper can use the system level rules to compare the commands residing in the shell history against a set of defined rules stored, for example, in a one or more configuration files. If the command matches a rule in the configuration file, the command is commented out in the shell history thereby preventing re-execution. The system administrator can implement a system rule to prevent an individual user from using certain commands regardless of privilege. In a setting where multiple users are simultaneously using a shared ID in which the users can interact with the same shell history, the system administrator can implement a system level rules that disable certain commands, which can then be re-enabled by authorized users. For example, the system administrator can disable a command that can remove a file hierarchy without requiring confirmation that the removal is desired, (rm–rf*). The system level rules can include the command or portion of the command in a configuration file and cause the shell wrapper to alter the command in the shell history by adding a # character prefix or rem to the command depending on the operating system 220 being used. Accordingly, the system administrator can force authorized users to actively remove the # character prefix or rem before re-executing the command from the shell history, which decreases the likelihood of re-executing a dangerous command unintentionally. Upon the application of the system level rules to the shell history, the computer-implemented method proceeds to block 330.

At block 330, determines whether the shell wrapper contains any user level rules. User level rules can be instituted, using a rules-type configuration file, by the user to specify rules for any manually executable based command line interface (CLI) command, for example, Linux/Unix/Windows commands. The rules-type configuration file for the user can reside, for example, in the user's $HOME directory, and can specify rules for any manually executable based command line interface (CLI) command considered dangerous by the user. The user level rules can be created and edited by the user. Accordingly, the user level rules can provide an individual user with the capability to specify their command protection preferences, unless superseded by the systems level rules. If user level rules do not exist, the computer-implemented method proceeds to block 340.

If user level rules exist, the computer-implemented method proceeds to block 335, where the user level rules are applied to the shell history. The user level rules can compare the commands residing in the shell history against a set of user-defined rules. If the command matches a rule in the configuration file created by the user, the previously executed command is commented out in the shell history. Accordingly, the user can force himself/herself to actively remove the # character prefix or rem before re-executing the command from the shell history, which decreases the likelihood of re-executing a dangerous command unintentionally. Upon the application of the user level rules to the shell history, the computer-implemented method proceeds to block 340.

At block 340, the computer-implemented method presents the shell history to a requesting user. The user can be working individually or can be one of multiple users simultaneously using a shared ID. At block 350, the computer-implemented method ends.

FIG. 4 depicts a shell history that has implemented a computer-implemented method of protecting against unintentional command re-execution according to one or more embodiments of the present invention. The shell history includes several potentially dangerous commands, for example, ifconfig en0 down on line 168. As illustrated, the shell history has implemented the system level rules and/or the user level rules. Accordingly, certain commands have been commented out after being compared to the system level rules and/or the user level rules. The depicted shell history can be a shell history for a user working individually or one of multiple users simultaneously using a shared ID. Accordingly, the user would have to actively remove the # character prefix or rem before re-executing the commands that have been commented out if the user is authorized to do so. The active removal of the # character prefix or rem from the shell history can cause the user to pause and re-evaluate the decision to re-execute a command thereby decreasing the risk of re-executing a dangerous command unintentionally.

Embodiments of the present invention can be applied to a variety of operating systems, for example, UNIX, Linux, Windows, etc. Embodiments of the present invention can also be applied to a variety of shells for an associated operating system, Bourne shell (sh), Bourne-Again shell (bash), C shell (csh), Korn shell (ksh), Z shell (zsh), Windows DOS shell, Windows PowerShell, etc.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for protecting against unintentional command re-execution, the method comprising:
applying a shell wrapper to a shell history, wherein the shell history comprises one or more commands;
analyzing each of the one or more commands in the shell history using the shell wrapper; and
disabling an ability to re-execute at least one of the one or more commands in the shell history based on a determination that the at least one of the one or more commands in the shell history are determined to be potentially dangerous, wherein the disabling includes inserting a prefix into the at least one of the one or more commands that must be removed in order for the at least one of the one or more commands to be executed.

2. The computer-implemented method of claim 1, wherein the shell wrapper comprises at least one of: system level rules or user level rules.

3. The computer-implemented method of claim 2, wherein the system level rules are rules applied to at least one of: individual users, user groups, shells or commands.

4. The computer-implemented method of claim 3, wherein the user groups are at least one of: user groups defined at a system level, user groups defined within applications and databases, user groups defined within a configuration file or all users.

5. The computer-implemented method of claim 3, wherein the shells are at least one of: individual shells, shell groups or all shells.

6. The computer-implemented method of claim 3, wherein the commands are at least one of: individual commands, commands groups or all commands.

7. The computer-implemented method of claim 1 further comprising re-enabling the previously disabled one or more commands in response to actions by a user, when the user is authorized to change commands that have been disabled.

8. The computer-implemented method of claim 1, wherein analyzing comprises comparing the one or more commands to a configuration file and designating the one or more commands as potentially dangerous when the one or more commands match at least one rule in the configuration file.

9. A computer program product for protecting against unintentional command re-execution, the computer program product comprising:
a computer readable storage medium having stored thereon first program instructions executable by a processor to cause the processor to:
apply a shell wrapper to a shell history, wherein the shell history comprises one or more commands;
analyze each of the one or more commands in the shell history using the shell wrapper; and
disable an ability to re-execute at least one of one or more commands in the shell history based on a determination that the at least one of the one or more commands in the shell history are determined to be potentially dangerous, wherein the disabling includes inserting a prefix into the at least one of the one or more commands that must be removed in order for the at least one of the one or more commands to be executed.

10. The computer program product of claim 9, wherein the shell wrapper comprises at least one of: system level rules or user level rules.

11. The computer program product of claim 10, wherein the system level rules are rules applied to at least one of: individual users, user groups, shells or commands.

12. The computer program product of claim 11, wherein the user groups are at least one of: user groups defined at a system level, user groups defined within applications and databases, user groups defined within a configuration file or all users.

13. The computer program product of claim 11, wherein the shells are at least one of: individual shells, shell groups or all shells.

14. The computer program product of claim 11, wherein the commands are at least one of: individual commands, commands groups or all commands.

15. The computer program product of claim 9, wherein the instructions are further executable by a processor to cause the processor to re-enable the previously disabled one or more commands in response to actions by a user, when the user is authorized to change commands that have been disabled.

16. The computer program product of claim 9, wherein analyzing comprises comparing the one or more commands to a configuration file and designating the one or more commands as potentially dangerous when the one or more commands match at least one rule in the configuration file.

17. A system, comprising:
one or more processors; and
at least one memory, the memory including instructions that, upon execution by at least one of the one or more processors, cause the system to perform a method for analyzing and prioritizing incoming user messages, the method comprising:
applying a shell wrapper to a shell history, wherein the shell history comprises one or more commands;
analyzing each of the one or more commands in the shell history using the shell wrapper; and
disabling an ability to re-execute at least one of the one or more commands in the shell history based on a determination that the at least one of the one or more commands in the shell history are determined to be potentially dangerous, wherein the disabling includes inserting a prefix into the at least one of the one or more commands that must be removed in order for the at least one of the one or more commands to be executed.

18. The system of claim 17, wherein the shell wrapper comprises at least one of: system level rules or user level rules.

19. The system of claim 17, wherein the method further comprises re-enabling the previously disabled one or more commands in response to actions by the user, when the user is authorized to change commands that have been disabled.

20. The system of claim 17, wherein analyzing comprises comparing the one or more commands to a configuration file and designating the one or more commands as potentially dangerous when the one or more commands match at least one rule in the configuration file.

\* \* \* \* \*